(12) United States Patent
Iwata

(10) Patent No.: US 9,134,722 B2
(45) Date of Patent: Sep. 15, 2015

(54) ROBOT CONTROLLING APPARATUS AND ROBOT CONTROLLING METHOD

(75) Inventor: Masumitsu Iwata, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 27 days.

(21) Appl. No.: 13/982,393

(22) PCT Filed: Jan. 26, 2012

(86) PCT No.: PCT/JP2012/000488
§ 371 (c)(1),
(2), (4) Date: Jul. 29, 2013

(87) PCT Pub. No.: WO2012/105194
PCT Pub. Date: Aug. 9, 2012

(65) Prior Publication Data
US 2013/0310974 A1    Nov. 21, 2013

(30) Foreign Application Priority Data

Feb. 2, 2011    (JP) .................................. 2011-020569

(51) Int. Cl.
*G05B 19/18*    (2006.01)
*G05B 19/4067*    (2006.01)

(52) U.S. Cl.
CPC .. *G05B 19/4067* (2013.01); *G05B 2219/50082* (2013.01); *G05B 2219/50083* (2013.01)

(58) Field of Classification Search
CPC ................ B25J 9/1664; G05B 19/425; G05B 2219/45083
USPC .......................... 700/245, 248, 250, 252, 258
See application file for complete search history.

(56) References Cited

U.S. PATENT DOCUMENTS 6,356,806 B1 * 3/2002 Grob et al. ..................... 700/245
6,778,867 B1 * 8/2004 Ziegler et al. ................... 700/79

(Continued)

FOREIGN PATENT DOCUMENTS

DE    4031057 A1    4/1991
EP    1247622 A2    10/2002

(Continued)

OTHER PUBLICATIONS

International Preliminary Report on Patentability dated Aug. 6, 2013 in corresponding PCT Patent Application No. PCT/JP2012/000488.

(Continued)

*Primary Examiner* — Ian Jen
(74) *Attorney, Agent, or Firm* — Fitzpatrick, Cella, Harper & Scinto

(57) ABSTRACT

To allow a robot body to quickly resume operation, using simple control, when a main power supply is restored after a failure. A calculation unit divides a series of operations of the robot body into a plurality of operation blocks in advance and causes the robot body to perform operations sequentially from one operation block to another using power supplied from the main power supply (S21 to S25). The calculation unit causes the robot body to continue operation using the power supplied from an auxiliary power supply, even if the main power supply fails, until the operation block being processed at the time of the failure of the main power supply out of the plurality of operation blocks is finished (S27). The calculation unit causes the robot body to stop operation, when the operation block being processed at the time of the failure of the main power supply is finished, until the main power supply is restored from the failure (S28). When the main power supply is restored from the failure, the calculation unit causes the robot body to resume operation beginning with an operation block next to the operation block caused by the calculation unit to be performed by the robot body in the process of step S27 (S30, S31, and S22).

8 Claims, 5 Drawing Sheets

(56) References Cited

U.S. PATENT DOCUMENTS

| | | | |
|---|---|---|---|
| 2004/0249506 A1* | 12/2004 | Hayashi et al. | 700/245 |
| 2012/0241417 A1* | 9/2012 | Mehn et al. | 219/108 |
| 2013/0169046 A1* | 7/2013 | Shin et al. | 307/23 |

FOREIGN PATENT DOCUMENTS

| | | | |
|---|---|---|---|
| FR | 2895927 A1 | 7/2007 | |
| JP | 8-294886 A | 11/1996 | |
| JP | 2000-137511 A | 5/2000 | |
| WO | 2005/091112 A1 | 9/2005 | |
| WO | 2010/069369 A1 | 6/2010 | |

OTHER PUBLICATIONS

Japanese Office Action dated Mar. 31, 2015 corresponding to Japanese Application No. 2011-020569.

* cited by examiner

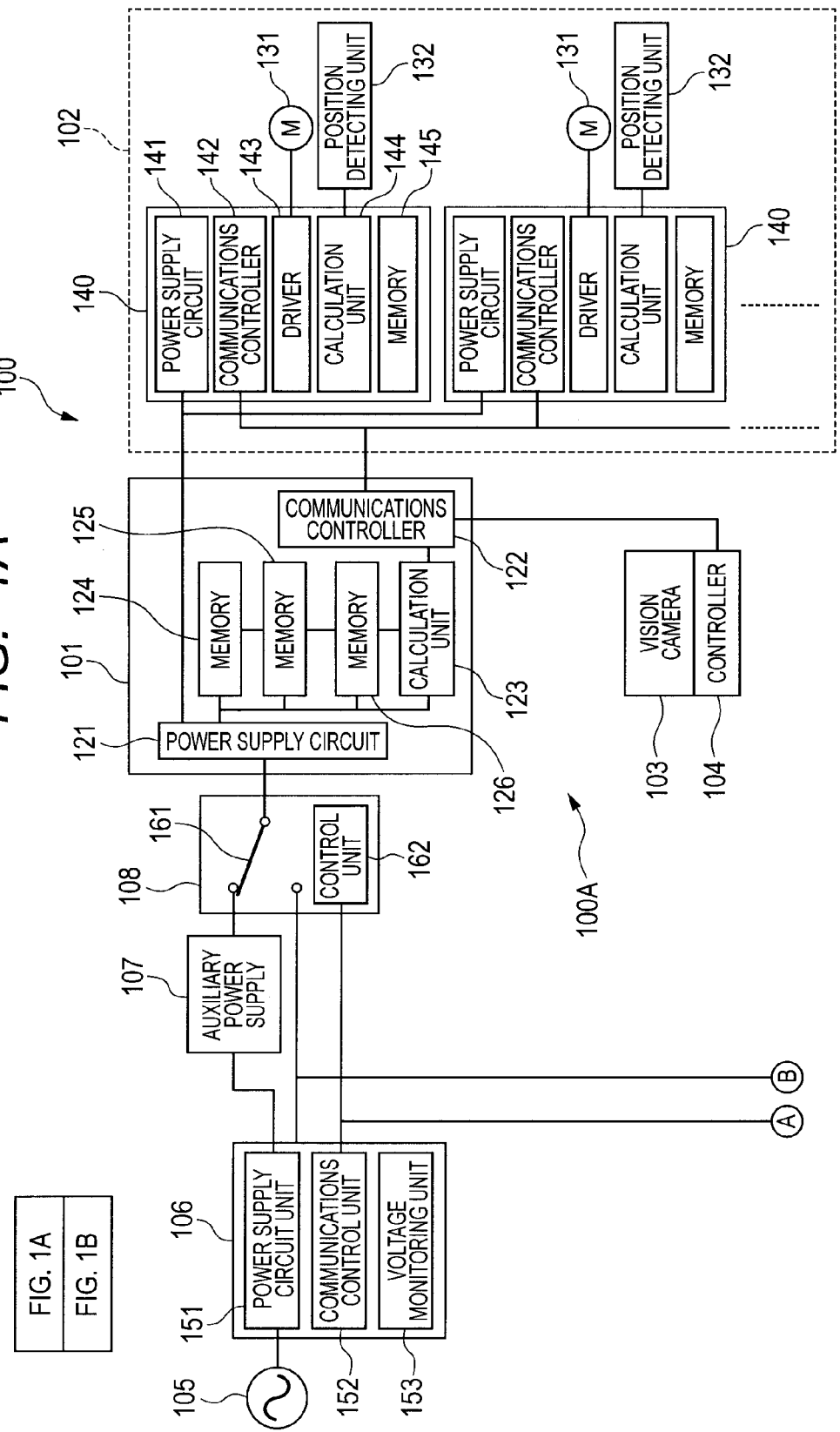

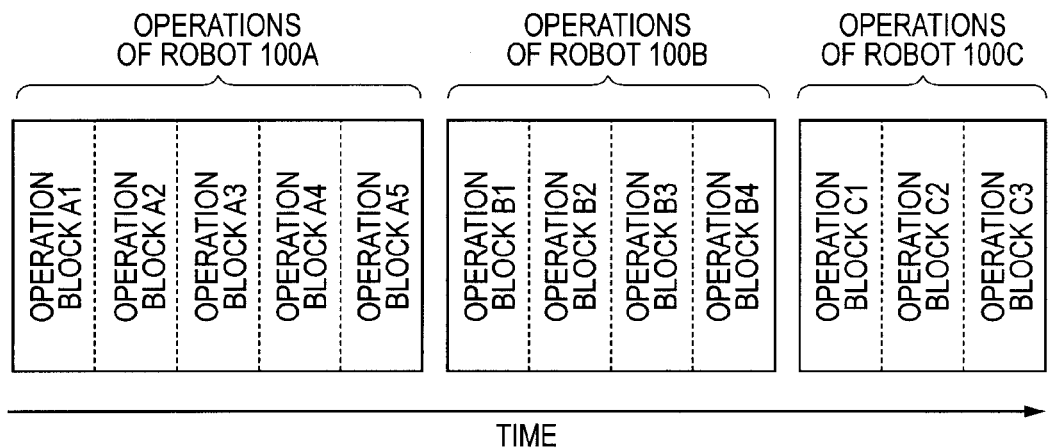
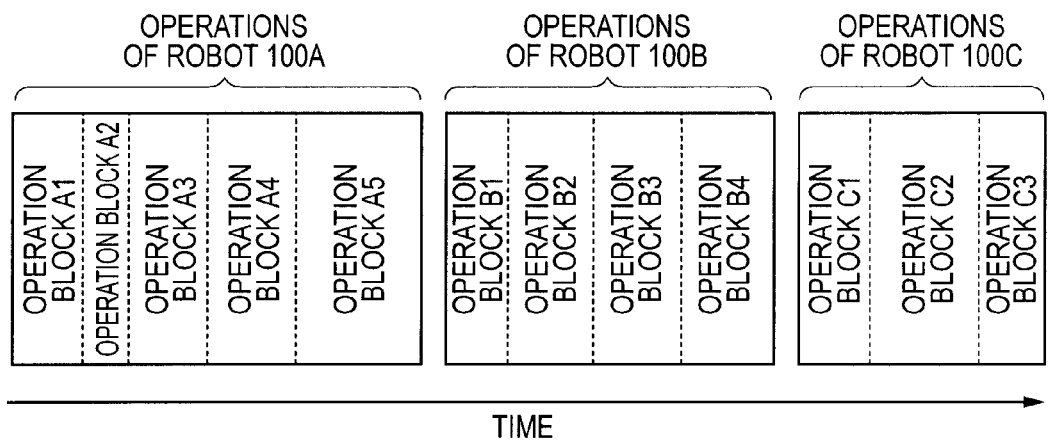

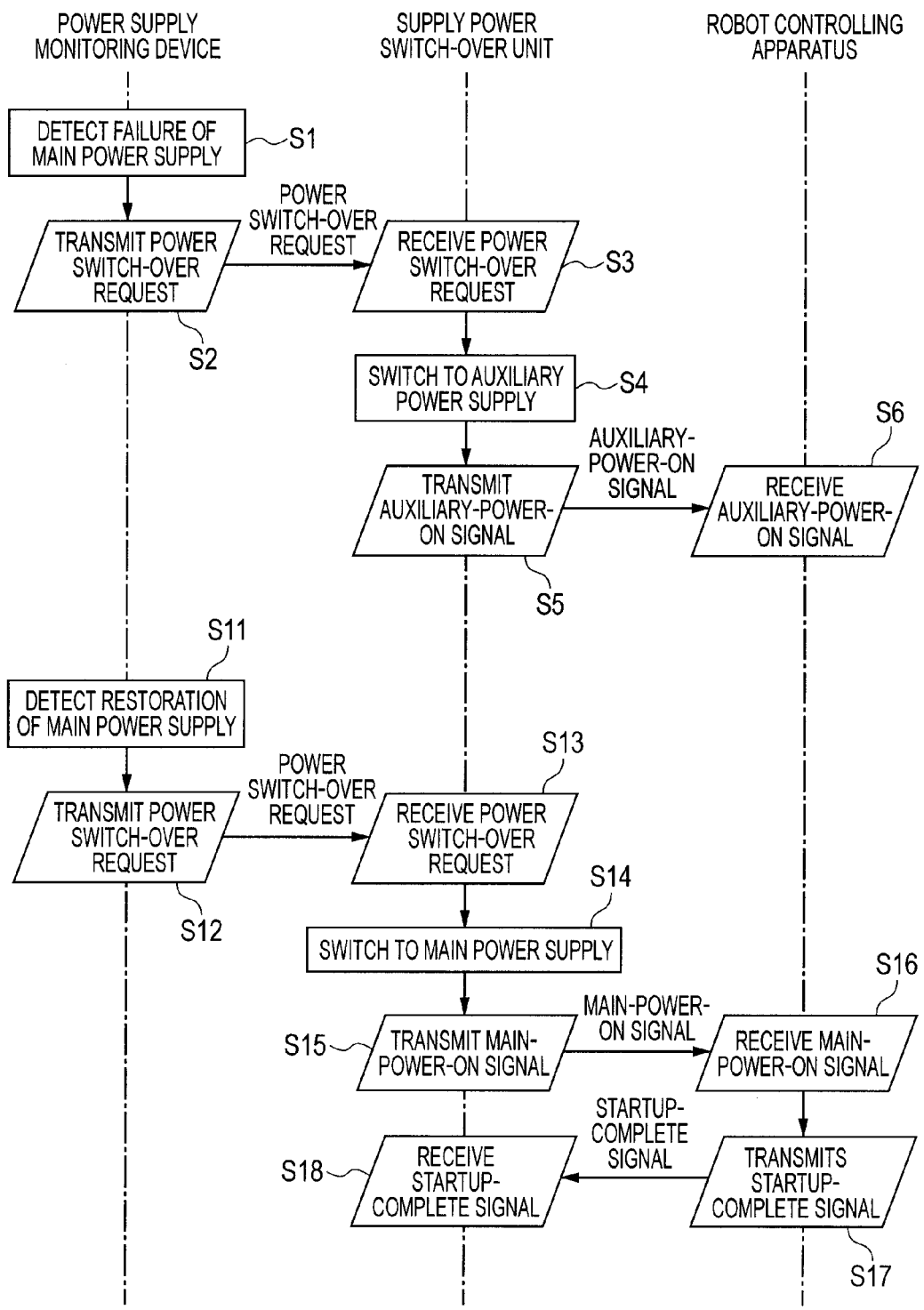

ROBOT CONTROLLING APPARATUS AND ROBOT CONTROLLING METHOD

TECHNICAL FIELD

The present invention relates to a robot controlling apparatus and robot controlling method which control motions of a robot body when a main power supply fails.

BACKGROUND ART

Conventionally, industrial robots which perform automatic processing or assembly operations stop operation due to a failure of a main power supply in case of a power failure during automatic operation. After restoration of power, an operator has to restore operating conditions and discharge work-in-process. Consequently, a robot reset operation becomes complicated and requires time, resulting in reduced throughput of the production line.

Thus, a robot controlling apparatus has been proposed which automatically performs a reset action of a robot body when the main power supply is restored after a power failure (see PTL 1). The robot controlling apparatus memorizes a stop position of the robot body, state of a hand of the robot body, and the like if the robot body stops in the middle of an operation due to a power failure. When the main power supply is restored, the robot controlling apparatus reads a recovery program corresponding to a memorized state of the robot body out of multiple recovery programs. Next, the robot controlling apparatus returns the robot body to its initial state according to the read recovery program and them causes the robot body to resume operation.

CITATION LIST

Patent Literature

PTL 1: Japanese Patent Application Laid-Open No. H08-294886

SUMMARY OF INVENTION

Technical Problem

However, it is assumed that the robot body will take various postures according to operations. Also, it is necessary to take into consideration the position and state of the workpiece being handled when the robot body stops. Furthermore, it is troublesome to create, in advance, a large number of recovery programs capable of dealing with these diverse circumstances. Besides, since the recovery program is executed after restoration of power, it takes time before operation can be resumed.

Thus, it is a feature of the present invention to provide a robot controlling apparatus and robot controlling method which allow a robot body to quickly resume operation, using simple control, when a main power supply is restored after a failure.

Solution to Problem

The present invention provides a robot controlling apparatus for controlling a robot body which runs on power supplied from an auxiliary power supply when a main power supply fails, the robot controlling apparatus comprising: an operation controlling unit adapted to divide a series of operations of the robot body into a plurality of operation blocks in advance and cause the robot body to perform operations sequentially from one operation block to another using power supplied from the main power supply; an operation continuing unit adapted to cause the robot body to continue operation using the power supplied from the auxiliary power supply, even if the main power supply fails, until the operation block being processed at the time of the failure of the main power supply out of the plurality of operation blocks is finished; and an operation stopping unit adapted to cause the robot body to stop operation, when the operation block being processed at the time of the failure of the main power supply is finished, until the main power supply is restored from the failure, wherein when the main power supply is restored from the failure, the operation controlling unit causes the robot body to resume operation beginning with an operation block next to the operation block caused by the operation continuing unit to be completed by the robot body.

Also, the present invention provides a robot controlling method for controlling a robot body which runs on power supplied from an auxiliary power supply when a main power supply fails, the robot controlling method comprising: dividing a series of operations of the robot body into a plurality of operation blocks in advance and causing the robot body to perform operations sequentially from one operation block to another using power supplied from the main power supply; causing the robot body to continue operation using the power supplied from the auxiliary power supply, even if the main power supply fails, until the operation block being processed at the time of the failure of the main power supply out of the plurality of operation blocks is finished; causing the robot body to stop operation, when the operation block being processed at the time of the failure of the main power supply is finished, until the main power supply is restored from the failure; and causing the robot body to resume operation, when the main power supply is restored from the failure, beginning with an operation block next to the operation block completed so far by the robot body.

Advantageous Effects of Invention

According to the present invention, when the main power supply fails, since the robot body is stopped operating after the operations in the operation block are finished, there is no need to prepare recovery programs which can deal with every possible posture of the robot body. Also, when the failed main power supply is restored, since the robot body is caused to perform operation by beginning with an operation block next to the finished operation block without the need to return to its initial posture, the robot body can resume operation quickly.

Further features of the present invention will become apparent from the following description of exemplary embodiments with reference to the attached drawings.

BRIEF DESCRIPTION OF DRAWINGS

FIG. 1A is a block diagram showing a schematic configuration of a robot system equipped with a robot controlling apparatus according to an embodiment of the present invention. FIG. 1 is comprised of FIGS. 1A and 1B.

FIG. 1 is comprised of FIGS. 1A and 1B.

FIG. 2A is an explanatory diagram showing an example of division of a series of operations of a robot body into operation blocks carried out in such a way as to equalize operation time.

FIG. 2B is an explanatory diagram showing an example of division of a series of operations of a robot body into operation blocks carried out in such a way as to equalize an amount of consumed electrical power.

FIG. 3 is a sequence diagram showing actions performed by a power supply monitoring device, a supply power switch-over unit, and the robot controlling apparatus when a main power supply fails and when the main power supply is restored from the failure.

DESCRIPTION OF EMBODIMENTS

Figure 1B:
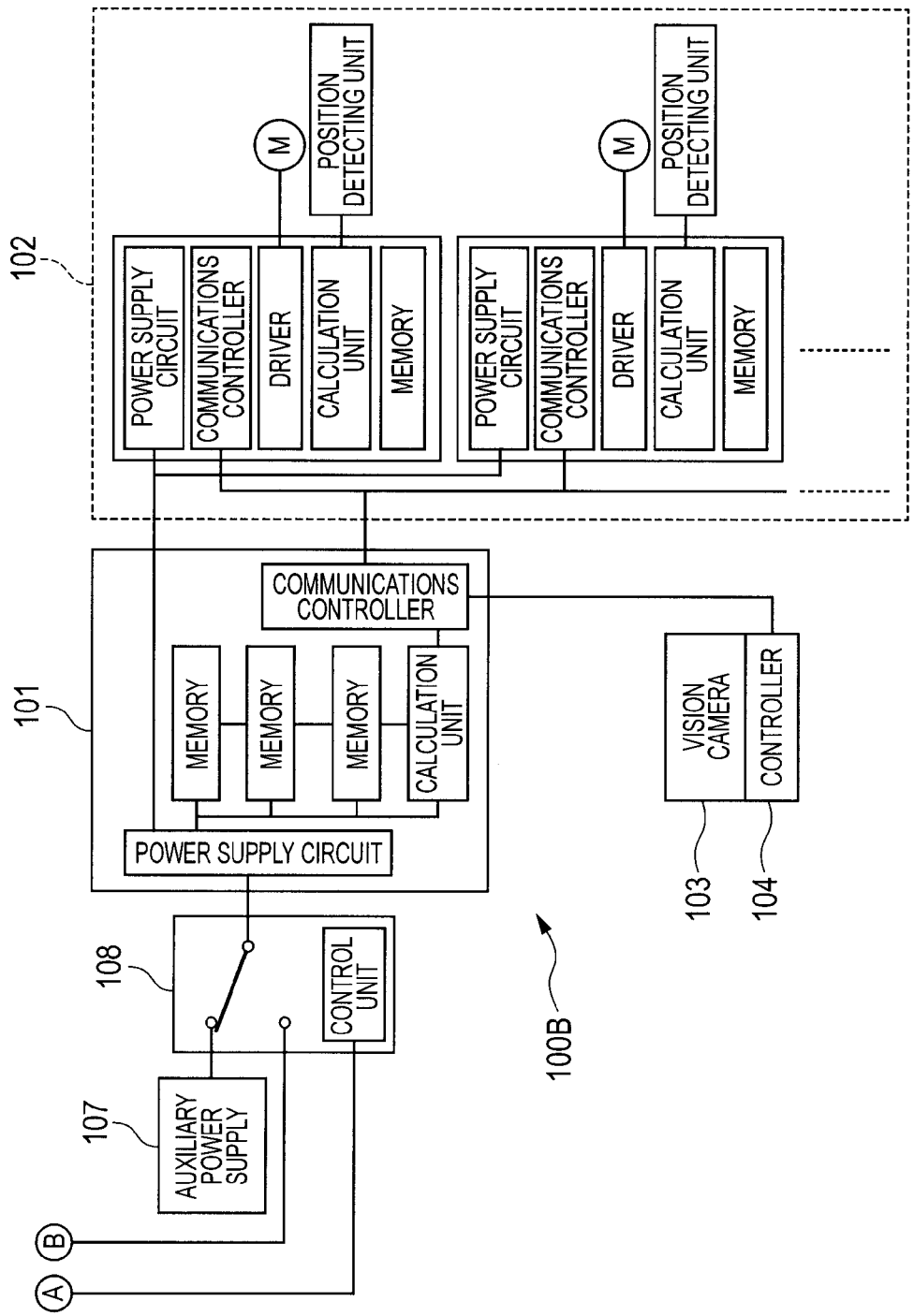
FIG. 1B is a block diagram showing a schematic configuration of a robot system equipped with a robot controlling apparatus according to an embodiment of the present invention.

An embodiment of the present invention will be described in detail below with reference to the accompanying drawings. It should be noted that the robot controlling apparatus and robot controlling method according to the present invention is in no way limited to the embodiment described below. FIGS. 1A and 1B are block diagrams showing a schematic configuration of a robot system equipped with a robot controlling apparatus according to an embodiment of the present invention.

The robot system 100 shown in FIGS. 1A and 1B include multiple robots 100A, 100B, . . . , and achieves automatic assembly and the like as the robots 100A, 100B, . . . performs collaborative work or share work on a production line. Each of the robots 100A, 100B, . . . includes a robot body 102 and a robot controlling apparatus 101 adapted to control the robot body 102 based on operation data. The robot body 102 is equipped with a multi-joint arm (not shown) and an end effector such as a hand (not shown) and adapted to perform various operations including, for example, a processing operation of workpieces to be processed, an assembly operation of the workpieces, and grip and transport operation of the workpieces. Also, each of the robots 100A, 100B, . . . includes a vision camera 103 adapted to capture images of workpieces and a controller 104 adapted to control the vision camera 103.

The robot controlling apparatus 101 includes a power supply circuit 121, a communications controller 122 adapted to conduct send/receive communications with respect to peripheral devices, and a calculation unit 123 adapted to perform a computational process for trajectory calculations and the like. Also, the robot controlling apparatus 101 includes nonvolatile memories 124 and 125 free from data loss even if power supply stops as well as a volatile memory 126 temporarily used in computations and the like.

The nonvolatile memory 124 memorizes motion data used for motions of the robot body 102. The motion data includes motion planning data of industrial robots, a system control program, a trajectory generation program, and a control program for a vision camera as well as control data and a control program for ancillary facilities (not shown).

The calculation unit 123 performs the process of carrying out trajectory calculations and generating a robot motion plan based on the motion data and the process of dividing a series of operations of the robot body 102 into multiple operation blocks in advance based on the motion data and causing the robot body 102 to perform operations sequentially from one operation block to another. Also, the calculation unit 123 performs trajectory generation and trajectory correction based on workpiece conditions detected by the vision camera 103. The motion planning data of the robot body 102 included in the motion data is made up of the operation data on each of the operation blocks resulting from the division and data on an execution sequence of the operation blocks. Alternatively, the motion planning data may be made up of a series of operation data and data on start and end points of each of the operation blocks resulting from the division. The nonvolatile memory 125 memorizes an operation block identifier of the current operation block. The volatile memory 126 is used to temporarily hold computational data during trajectory calculations of the robot body 102.

The robot body 102 includes servo motors 131 and position detecting units 132 installed on respective axes, where the servo motors 131 are adapted to drive the axes and the position detecting units 132 are adapted to detect axial positions. Also, the robot body 102 includes axial control units 140 installed for respective axes. Each axial control unit 140 is made up of an axial power supply circuit 141, a communications controller 142 adapted to perform communications control, a driver 143 used to drive the motor, a calculation unit 144 adapted to perform computations for servo motor control, and a memory 145. These components perform distributed control of the respective axes.

As the position detecting units 132, it is desirable to use absolute encoders which do not require a reference position detecting action after power restoration. The axial control units 140 provided for the respective axes make the communications controllers 142 receive motion commands from the communications controller 122 of the robot controlling apparatus 101, drive the servo motors 131 based on the motion commands, and transmit data needed for trajectory correction and axial control in terms of axial positions. Based on positional information from the position detecting units 132 and detection results produced by servo motor drive current detecting units (not shown), the calculation units 144 perform position feedback control, speed feedback control, and drive current control of the servo motors 131.

Also, the robot system 100 includes a power supply monitoring device 106. Also, the robot system 100 has auxiliary power supplies 107 installed on the respective robots 100A, 100B, . . . . Furthermore, the robot system 100 has supply power switch-over units 108 installed on the respective robots 100A, 100B, . . . in order for each robot to be supplied with power by switching a drive power supply system between a main power supply 105 and the auxiliary power supply 107. The supply power switch-over units 108 do switching to allow the respective robots 100A, 100B, . . . to run normally on the power supplied from the main power supply 105 and run on the power supplied from the respective auxiliary power supplies 107 when the main power supply 105 fails. The main power supply 105 is a commercial power supply, a generator, or the like.

The auxiliary power supply 107 is a backup power supply with sufficient electrical power capacity to supply power needed for motions of the robot body 102 from start to end of one operation block. The auxiliary power supply 107 includes an uninterruptible power supply system and an inverter, where the uninterruptible power supply system is connected to the main power supply 105 and made up of a rectifier and a power storage device such as a rechargeable battery or capacitor. The power storage device is charged with electrical power supplied from the main power supply 105 after conversion from alternating current into direct current by the rectifier. When supplied from the auxiliary power supply 107 to the robot body 102 and robot controlling apparatus 101, the electrical power is subjected to conversion from direct current into alternating current by the inverter and an ac voltage as with the main power supply 105 is applied to the robot body 102 and robot controlling apparatus 101.

The power supply monitoring device 106 includes a power supply circuit unit 151, a communications control unit 152, and a voltage monitoring unit 153. The power supply monitoring device 106 runs on the power supplied from the auxiliary power supply 107. The supply power switch-over unit 108 includes a power supply selector switch 161 and a control unit 162 adapted to control the power supply selector switch 161.

The voltage monitoring unit 153 of the power supply monitoring device 106 monitors for a power failure of the main power supply 105 such as a voltage sag or interruption. The communications control unit 152 exchanges signals with the control unit 162 of the supply power switch-over unit 108. More specifically, the voltage monitoring unit 153 determines whether the voltage of the main power supply 105 is above or below a threshold voltage set in advance. If the voltage of the main power supply 105 is below the threshold voltage (in case of a power failure), the communications control unit 152 outputs a power switch-over request to the control unit 162 of the supply power switch-over unit 108, requesting the power supply to be switched from the main power supply 105 to the auxiliary power supply 107. On the other hand, when the voltage of the main power supply 105 is above the preset threshold voltage (when power is restored), the communications control unit 152 outputs a power switch-over request to the control unit 162 of the supply power switch-over unit 108, requesting the power supply to be switched from the auxiliary power supply 107 to the main power supply 105.

The control unit 162 of the supply power switch-over unit 108 has a communications controller (not shown) and switches a supply power path by operating the power supply selector switch 161 when a power switch-over request is received by the communications controller.

Division into operation blocks for the robot which runs on the power from the main power supply 105 will be described. FIG. 2A is an explanatory diagram showing an example of division into operation blocks carried out in such a way as to equalize operation time. In the following description, it is assumed that the robot system 100 is made up of robots 100A, 100B, and 100C. The robot 100C has a configuration similar to the configuration of the robots 100A and 100B.

In the present embodiment, description will be given of a case in which the robots 100A, 100B, and 100C operate one after another in this order, each starting to operate after the immediately preceding robot finishes operation. When the robots 100A, 100B, and 100C perform automatic assembly by dividing work among them on a production line, waiting times are provided for delivery of assembly parts.

The calculation unit 123 of the robot controlling apparatus 101 of the robot 100A divides a series of operations of the robot body 102 of the robot 100A into multiple (five in FIG. 2A) operation blocks A1 to A5 in advance and causes the robot body 102 to perform the operations in the operation blocks A1 to A5 in sequence. The calculation unit 123 of the robot controlling apparatus 101 of the robot 100B divides a series of operations of the robot body 102 of the robot 100B into multiple (four in FIG. 2A) operation blocks B1 to B4 in advance and causes the robot body 102 to perform the operations in the operation blocks B1 to B4 in sequence. The calculation unit 123 of the robot controlling apparatus 101 of the robot 100C divides a series of operations of the robot body 102 of the robot 100C into multiple (three in FIG. 2A) operation blocks C1 to C3 in advance and causes the robot body 102 to perform the operations in the operation blocks C1 to C3 in sequence. That is, when power is supplied from the main power supply 105, the calculation units 123 of the robot controlling apparatus 101 of the robots 100A, 100B, and 100C function as operation controlling units (described later) adapted to run based on a program.

In FIG. 2A, the calculation unit 123 of the robot controlling apparatus 101 of the robot 100A divides the series of operations of the robot body 102 in such a way as to equalize operation time of the robot body 102 among the operation blocks A1 to A5. Similarly, in FIG. 2A, the calculation unit 123 of the robot controlling apparatus 101 of the robot 100B divides the series of operations of the robot body 102 in such a way as to equalize operation time of the robot body 102 among the operation blocks B1 to B4. Similarly, in FIG. 2A, the calculation unit 123 of the robot controlling apparatus 101 of the robot 100C divides the series of operations of the robot body 102 in such a way as to equalize operation time of the robot body 102 among the operation blocks C1 to C3. In this way, the operation time of the robot body 102 is set to be equal among the operation blocks.

Although the operation time of the robot body 102 is equal among the operation blocks A1 to A5, the amount of consumed electrical power of the robot 100A varies among the operation blocks A1 to A5. Therefore, the auxiliary power supply 107 of the robot 100A is set to an electrical power capacity high enough to supply electrical power to the robot 100A in the operation block in which the operation of the robot body 102 consumes the largest amount of electrical power out of the operation blocks A1 to A5. The same is true for the auxiliary power supplies 107 of the robots 100B and 100C.

Consequently, when the robots 100A, 100B, and 100C operate simultaneously, starts and ends of operation in operation blocks are timed properly among the robots, stabilizing the motions of the robots.

Next, description will be given of a case in which the amount of consumed electrical power is equalized instead of the operation time. FIG. 2B is an explanatory diagram showing an example of division into operation blocks carried out in such a way as to equalize the amount of consumed electrical power.

In FIG. 2B, the calculation unit 123 of the robot controlling apparatus 101 of the robot 100A divides the series of operations of the robot body 102 in such a way as to equalize the amount of electrical power consumed by motions of the robot body 102 among the operation blocks A1 to A5. Similarly, in FIG. 2B, the calculation unit 123 of the robot controlling apparatus 101 of the robot 100B divides the series of operations of the robot body 102 in such a way as to equalize the amount of electrical power consumed by motions of the robot body 102 among the operation blocks B1 to B4. Similarly, in FIG. 2B, the calculation unit 123 of the robot controlling apparatus 101 of the robot 100C divides the series of operations of the robot body 102 in such a way as to equalize the amount of electrical power consumed by motions of the robot body 102 among the operation blocks C1 to C3. In this way, although the operation time of the robot body 102 varies among the operation blocks the amount of electrical power consumed by the operation of the robot body 102 is set to be equal among the operation blocks. Therefore, when the robot body 102 operates in the given operation block after switching to the auxiliary power supply 107, the electrical power stored in the auxiliary power supply 107 is used effectively.

A case in which the robots 100A, 100B, . . . run on the power supplied from the main power supply 105 has been described above, and description will be given below of actions taken in case of a power failure of the main power supply 105 such as a voltage drop or interruption.

FIG. 3 is a sequence diagram showing actions performed by the power supply monitoring device 106, supply power switch-over unit 108, and robot controlling apparatus 101 when the main power supply 105 fails and when the main power supply 105 is restored after the failure.

If a failure of the main power supply 105 is detected (S1), specifically, if the voltage of the main power supply 105 falls below the threshold voltage, the power supply monitoring device 106 outputs a power switch-over request to the supply power switch-over unit 108, requesting the power supply to be switched from the main power supply 105 to the auxiliary power supply 107 (S2). Upon receiving the power switch-over request (S3), the supply power switch-over unit 108 switches the power supply path from the main power supply 105 to the auxiliary power supply 107 (S4). Next, the supply power switch-over unit 108 transmits an auxiliary-power-on signal to the robot controlling apparatus 101, indicating that the power supply path has been switched to the auxiliary power supply 107 (S5). Upon receiving the auxiliary-power-on signal (S6), the robot controlling apparatus 101 carries out steps for dealing with a power failure (described later).

Next, if it is detected that the main power supply 105 has been restored from the failure (S11), specifically, if the voltage of the main power supply 105 rises above the threshold voltage, the power supply monitoring device 106 outputs a power switch-over request to the supply power switch-over unit 108, requesting the power supply to be switched from the auxiliary power supply 107 to the main power supply 105 (S12).

Upon receiving the power switch-over request (S13), the supply power switch-over unit 108 switches the power supply path from the auxiliary power supply 107 to the main power supply 105 (S14). Once the power supply is switched from the auxiliary power supply 107 to the main power supply 105, the robot controlling apparatus 101 can perform processing using the main power supply 105 and the robot body 102 can be driven by the main power supply 105. Next, the supply power switch-over unit 108 transmits an main-power-on signal to the robot controlling apparatus 101, indicating that the power supply path has been switched to the main power supply 105 (S15). Upon receiving the main-power-on signal (S16), the robot controlling apparatus 101 initializes internal variables and the like and then transmits a startup-complete signal (S17). The supply power switch-over unit 108 receives the startup-complete signal (S18). The supply power switch-over unit 108 counts a predetermined time-out period after the switch over from the auxiliary power supply 107 to the main power supply 105. If there is no notification about completion of startup from the robot controlling apparatus 101 within the predetermined period, the supply power switch-over unit 108 notifies the operator of a startup time error of the robot controlling apparatus 101.

Figure 4:
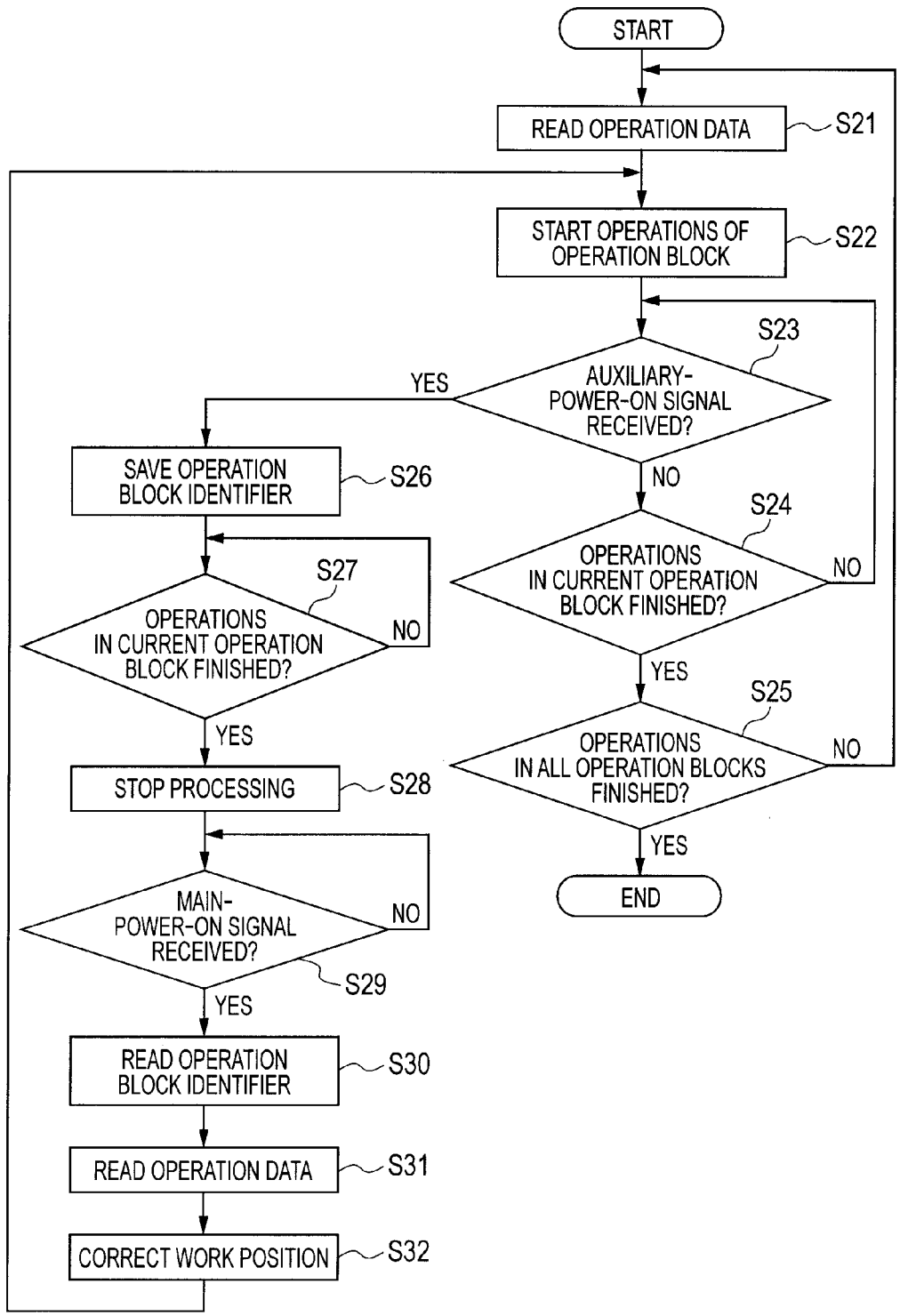
FIG. 4 is a flowchart showing actions of a calculation unit of the robot controlling apparatus.

Next, actions of the calculation unit 123 of the robot controlling apparatus 101 will be described. FIG. 4 is a flowchart showing actions of the calculation unit 123 of the robot controlling apparatus 101. The processes of the calculation unit 123 described below are based on a program stored in the memory 124.

First, the calculation unit 123 divides a series of operations of the robot body 102 into multiple operation blocks in advance. Then, the calculation unit 123 reads the operation data on one operation block to be handled out of the memory 124 (S21) and causes the robot body 102 to start the operations in the operation block (S22). The calculation unit 123 determines whether or not an auxiliary-power-on signal such as described with reference to FIG. 3 has been received from the supply power switchover unit 108 (S23). If no auxiliary-power-on signal has been received (S23: No), the calculation unit 123 determines whether or not the robot body 102 has finished the operations in the current operation block (S24). If the operations have not been finished (S24: No), the calculation unit 123 causes the robot body 102 to continue operation until the operations in the operation block are finished, while waiting for an auxiliary-power-on signal.

When the operations in the current operation block have been finished (S24: Yes), the calculation unit 123 determines whether or not there is a next operation block (S25). If there is a next operation block (S25: Yes), the calculation unit 123 reads the operation data on the operation block out of the memory 124 (S21) and performs similar processes (S22 to S25). When the operations in all the operation blocks are finished (S25: Yes), the calculation unit 123 finishes processing and waits until the robot body 102 is caused to perform next operations.

Through process actions in steps S21 to S25, the calculation unit 123 causes the robot body 102 to perform operations sequentially from one operation block to another by drawing power from the main power supply 105 (operation controlling unit and operation controlling step).

Next, if an auxiliary-power-on signal is received while the robot body 102 is working (S23: Yes), the calculation unit 123 saves an operation block identifier in the memory 125 (S26), where the operation block identifier represents the operation block the robot body 102 is currently working on. The reception of the auxiliary-power-on signal by the calculation unit 123 means that the main power supply 105 has failed and has been replaced by the auxiliary power supply 107. Consequently, the robot body 102 and robot controlling apparatus 101 are running on the power supplied from the auxiliary power supply 107.

Next, the calculation unit 123 causes the robot body 102 to continue operation using the power supplied from the auxiliary power supply 107 until the operation block being processed at the time of the failure of the main power supply 105 out of the multiple operation blocks is finished (S27: operation continuing unit and operation continuing step).

Next, when the operation block being processed at the time of the failure of the main power supply 105 is finished, the calculation unit 123 causes the robot body 102 to stop operation until the main power supply 105 is restored from the failure (S28: operation stopping unit and operation stopping step). When causing the robot body 102 to stop operation, the calculation unit 123 may put the robot body 102 on standby in a predetermined posture to ensure that operation can be resumed quickly when the main power supply 105 is restored.

The calculation unit 123 causes the robot body 102 to stop operation until a main-power-on signal is received (S29: No), but upon receiving a main-power-on signal (S29: Yes), the calculation unit 123 reads the operation block identifier saved in the memory 125 (S30). Next, in order to cause the robot body 102 to resume operation by beginning with the operation block next to the operation block finished in step S27, the calculation unit 123 identifies a next operation block based on the read operation block identifier and reads the operation data on the next operation block (S31). Since the calculation unit 123 has received a main-power-on signal, the main power supply 105 has been restored from the failure, and thus the robot body 102 and robot controlling apparatus 101 run on the power supplied from the main power supply 105.

Before causing the robot body 102 to resume operation in the next operation block, the calculation unit 123 corrects work position coordinates and a robot motion trajectory according to the workpiece conditions detected by the vision camera 103 (S32). Also, when multiple robots perform collaborative work, time adjustments may be made, for example, by providing wait times. If no such correction process is necessary, step S32 may be omitted.

After going through steps S30, S31, and S32, the calculation unit 123 causes the robot body 102 to resume operation by beginning with the operation block next to the operation block finished in step S27 (S22). The processing steps of S30, S31, and S22 make up an operation resuming step of causing the robot body 102 to resume operation. The process actions of the calculation unit 123 described above eliminate the need for the operator to perform a restoration operation directly.

Thus, according to the present embodiment, when the main power supply 105 fails, the robot body 102 is stopped after the operations in the operation block are finished. This eliminates the need to detect and memorize the posture of the robot body 102 and position of the workpiece even if the operation of the robot body 102 stops due to a power failure. Also, there is no need to prepare recovery programs which can deal with every possible posture of the robot body 102. Furthermore, according to the present embodiment, the robot body 102 is caused to assume a predetermined posture before restoration of the main power supply 105, eliminating the need to return the robot body 102 to its initial posture when the failed main power supply 105 is restored. After restoration of the main power supply 105, the robot body 102 is caused to resume operation by beginning with the operation block next to the finished operation block. This allows the robot body 102 to resume operation quickly, making it possible to increase throughput of the production line using simple control.

The present invention has been described by referring to the above embodiment, but the present invention is not limited to this. Although in the above embodiment, the robot body is caused to assume a predetermined posture in step S28 when the main power supply fails, this is not restrictive. Although the operations in the next operation block can be performed quickly in a more reliable manner if the robot body is caused to assume a predetermined posture, as long as the operations in the next operation block can be performed quickly, the robot body may be stopped in any posture, such as a posture in which the robot body has finished operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-020569, filed Feb. 2, 2011, which is hereby incorporated by reference herein in its entirety.

REFERENCE SIGNS LIST

101 Robot controlling apparatus
102 Robot body
105 Main power supply
107 Auxiliary power supply
123 Calculation unit (operation controlling unit, operation continuing unit, operation stopping unit)

The invention claimed is:

1. A robot controlling apparatus for controlling a robot body which runs on power supplied from an auxiliary power supply when a main power supply fails, the robot controlling apparatus comprising:
an operation controlling unit constructed to divide a series of operations of the robot body into a plurality of operation blocks in advance and cause the robot body to perform operations sequentially from one operation block to another using power supplied from the main power supply;
an operation identifying unit constructed to identify an operation block being processed at a time of a failure of the main power supply from the plurality of operation blocks when the main power supply fails;
an operation continuing unit constructed to cause the robot body to continue operation using the power supplied from the auxiliary power supply, until the operation corresponding to the operation block being processed at the time of the failure of the main power supply is finished; and
an operation stopping unit constructed to cause the robot body to stop operation, when the operation block being processed at the time of the failure of the main power supply is finished, until the main power supply is restored from the failure, wherein
when the main power supply is restored from the failure, the operation controlling unit causes the robot body to resume operation beginning with a start point of an operation block next to the operation block being processed at the time of the failure of the main power supply.

2. The robot controlling apparatus according to claim 1, wherein when the robot body stops operation, the operation stopping unit causes the robot body to assume a predetermined posture.

3. The robot controlling apparatus according to claim 1, wherein the operation controlling unit divides the series of operations of the robot body so as to equalize operation time of the robot body among the operation blocks.

4. The robot controlling apparatus according to claim 1, wherein the operation controlling unit divides the series of operations of the robot body so as to equalize an amount of electrical power consumed by motions of the robot body among the operation blocks.

5. A robot controlling method for controlling a robot body which runs on power supplied from an auxiliary power supply when a main power supply fails, the robot controlling method comprising:
dividing a series of operations of the robot body into a plurality of operation blocks in advance and causing the robot body to perform operations sequentially from one operation block to another using power supplied from the main power supply;
identifying an operation block being processed at a time of a failure of the main power supply from the plurality of operation blocks when the main power supply fails;
causing the robot body to continue operation using the power supplied from the auxiliary power supply, until the operation corresponding to the operation block being processed at the time of the failure of the main power supply is finished;
causing the robot body to stop operation, when the operation block being processed at the time of the failure of the main power supply is finished, until the main power supply is restored from the failure; and
causing the robot body to resume operation, when the main power supply is restored from the failure, beginning with a start point of an operation block next to the operation block being processed at the time of the failure of the main power supply.

6. The robot controlling method according to claim 5, wherein when the robot body stops operation, the robot body is caused to assume a predetermined posture.

7. The robot controlling method according to claim 5, wherein operation time of the robot body is equal among the operation blocks.

8. The robot controlling method according to claim 5, wherein an amount of electrical power consumed by operation of the robot body is equal among the operation blocks.

* * * * *